US009016051B2

(12) United States Patent
Iwasaki (10) Patent No.: US 9,016,051 B2
(45) Date of Patent: Apr. 28, 2015

(54) BURNER DEVICE FOR RAISING TEMPERATURE OF EXHAUST GAS (75) Inventor: Eiji Iwasaki, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/989,994

(22) PCT Filed: Jan. 31, 2011

(86) PCT No.: PCT/JP2011/000522
§ 371 (c)(1),
(2), (4) Date: May 28, 2013

(87) PCT Pub. No.: WO2012/104894
PCT Pub. Date: Aug. 9, 2012

(65) Prior Publication Data
US 2013/0276437 A1    Oct. 24, 2013

(51) Int. Cl.
*F01N 3/10*        (2006.01)
*F01N 3/025*       (2006.01)

(52) U.S. Cl.
CPC ............... *F01N 3/0256* (2013.01); *F01N 3/025* (2013.01); *F01N 2240/14* (2013.01); *F01N 2240/20* (2013.01); *F01N 2610/1453* (2013.01); *F01N 3/103* (2013.01)

(58) Field of Classification Search
CPC ............... F01N 3/025–3/0256; F01N 3/103; F01N 2240/14; F01N 2240/30; F01N 2610/1453
USPC .............................. 60/286, 295, 300, 303, 320
See application file for complete search history.

(56) References Cited

U.S. PATENT DOCUMENTS

| 5,238,650 | A | * | 8/1993 | Sheller et al. ............... 422/174 |
| 5,826,428 | A | * | 10/1998 | Blaschke ..................... 60/303 |
| 2004/0156761 | A1 | | 8/2004 | Bruck et al. |
| 2009/0293455 | A1 | * | 12/2009 | Rodman et al. ............. 60/286 |
| 2011/0011063 | A1 | | 1/2011 | Tsujimoto et al. |
| 2012/0102920 | A1 | * | 5/2012 | Pipis, Jr. ..................... 60/274 |

FOREIGN PATENT DOCUMENTS

| EP | 0296435 A2 * | 4/1992 | |
| EP | 0296435 A2 * | 4/1992 | ............... F01N 3/02 |
| JP | 0828255 A | 1/1996 | |

(Continued)

OTHER PUBLICATIONS

Machine translation of JP 08-103662, 1996.*

(Continued)

*Primary Examiner* — Audrey K Bradley
*Assistant Examiner* — Mickey France
(74) *Attorney, Agent, or Firm* — Sughrue Mion, PLLC (57) ABSTRACT A burner device placed upstream of an exhaust treatment device mounted in an exhaust pipe to raise a temperature of an exhaust gas, comprises a fuel supply valve for supplying fuel into the exhaust pipe, an igniter that ignites the fuel supplied from the fuel supply valve, and a burner catalyst held in the exhaust pipe through a support member. The support member is formed in a corrugated shape in cross section including outer arc-shaped portions in contact with the exhaust pipe, inner arc-shaped portions in contact with an outer peripheral member of the burner catalyst, and coupling portions for coupling the outer arc-shaped portions and the inner arc-shaped portions to each other.

6 Claims, 9 Drawing Sheets

(56) References Cited

FOREIGN PATENT DOCUMENTS

| JP | 8-093459 A | 4/1996 |
| JP | 08103662 A | 4/1996 |
| JP | 2001-012235 A | 1/2001 |
| JP | 2004-537413 A | 12/2004 |
| JP | 2010-059886 A | 3/2010 |

OTHER PUBLICATIONS

Machine translation of JP 08-028255, 1996.*

* cited by examiner

BURNER DEVICE FOR RAISING TEMPERATURE OF EXHAUST GAS

CROSS REFERENCE TO RELATED APPLICATIONS

This application is a National Stage of International Application No. PCT/JP2011/000522 filed Jan. 31, 2011, the contents of all of which are incorporated herein by reference in their entirety.

TECHNICAL FIELD

This invention relates to a burner device and, more particularly, to a burner device provided upstream of an exhaust treatment device in an exhaust gas passage of an internal combustion engine to increase a temperature of an exhaust gas.

BACKGROUND ART

There is known a technique in which a burner device is provided upstream of an exhaust treatment device in an exhaust gas passage of an internal combustion engine, and a heated gas produced by the burner device is used to increase an exhaust gas temperature, thereby activating the exhaust treatment device (catalyst or the like) to be in a state capable of being treated (for example, refer to Patent Literature 1).

The burner device described in Patent Literature 1 includes a small-sized oxidation catalyst (hereinafter referred to as "burner catalyst") placed upstream of the exhaust treatment device, having a cross-sectional area smaller than that of the exhaust gas passage of the engine and allowing a portion of the exhaust gas to flow in the burner catalyst, fuel supply means that supplies fuel to the burner catalyst in the exhaust gas passage, and ignition means that ignites and burns the supplied fuel.

CITATION LIST

Patent Literature

PTL 1: Japanese Patent Laid-Open No. 2010-059886

SUMMARY OF INVENTION

Meanwhile, the burner device cited in the PTL 1 is structured to hold the burner catalyst having a cross-sectional area smaller than that of the exhaust gas passage in an exhaust pipe forming part of the exhaust gas passage, and uses a plurality of plate-shaped stays extending radially. Then, the axially upstream and downstream end regions in the inner-diameter ends of the plate-shaped stays are welded to the outer surface of the cylindrical outer frame of the burner catalyst, and the axially upstream and downstream end regions in the outer-diameter ends thereof are welded to the inner surface of the exhaust pipe.

However, the use of the plate-shaped stays having both ends welded in this manner involves a great difference in thermal expansion between the exhaust pipe exposed to the relatively-low-temperature atmosphere and, the burner catalyst and the cylindrical outer frame (casing) of the burner catalyst which are exposed to the high-temperature combustion gas, so that it is difficult to absorb the difference in thermal expansion not only in the axial direction of the burner device but also in the radial direction. As a result, thermal stress repeatedly occurs in the portions welded (joined) to the plate-shaped stays, which may possibly cause a reduction in durability of the burner device.

Also, the operation processes of welding the axially upstream and downstream end regions in the inner-diameter ends of the plate-shaped stays to the outer surface of the cylindrical outer frame of the burner catalyst and, in particular, of welding the axially upstream and downstream end regions in the outer-diameter ends to the inner surface of the exhaust pipe are complicated, thus making the manufacture hard and being unfitted for mass production.

Accordingly, it is an object of the present invention to provide a burner device for an exhaust-gas temperature rise which is capable of ensuring support stiffness to enhance durability while absorbing such a thermal expansion difference in spite of the presence of the thermal expansion difference, and also which can be manufactured relatively easily for mass production even if a welding operation is included.

To attain this object, a burner device according to an aspect of the present invention is a burner device placed upstream of an exhaust treatment device mounted in an exhaust pipe to raise a temperature of an exhaust gas, comprising: a fuel supply valve for supplying fuel into the exhaust pipe; an igniter that ignites the fuel supplied from the fuel supply valve; and a burner catalyst held in the exhaust pipe through a support member, wherein the support member is formed in a corrugated shape in cross section including outer arc-shaped portions in contact with the exhaust pipe, inner arc-shaped portions in contact with an outer peripheral member of the burner catalyst, and coupling portions for coupling the outer arc-shaped portions and the inner arc-shaped portions to each other.

With the burner device according to the aspect above, when the fuel supplied from the fuel supply valve is ignited by the igniter, the burning flame passes in the burner catalyst held in the exhaust pipe through the support member, and also passes in the passage between the burner catalyst and the exhaust pipe. Thereby, even if a difference in thermal expansion occurs between the exhaust pipe and, the burner catalyst and the outer peripheral member of the burner catalyst, the differences in thermal expansion in the axial direction and the radial direction of the burner device are absorbed by the support member formed in a corrugated shape in cross section. The support stiffness of the burner catalyst in the burner device can be ensured to increase the durability.

Here, in the aspect of the present invention, each of angles formed by each of the outer arc-shaped portions and each of the coupling portions, and by each of the inner arc-shaped portions and each of the coupling portions in a plane orthogonal to an axis of the exhaust pipe is preferably an obtuse angle. With this structure, when a difference in thermal expansion in the radial direction occurs between the exhaust pipe and, the burner catalyst and the outer peripheral member of the burner catalyst, the coupling portion elastically deforms without buckling, making it possible to lessen the thermal stress.

In the aspect of the present invention, each of passages formed between the exhaust pipe and the support member and between the support member and the outer peripheral member of the burner catalyst is not formed in parallel to the axis of the exhaust pipe, but is preferably formed in a twist manner. With this structure, the mixing of the flames, which flow in the passage between the exhaust pipe and the outer peripheral member of the burner catalyst, downstream of the burner catalyst is enhanced, so that the temperature becomes uniform, improving the effect of raising the temperature of the exhaust gas.

Further, the exhaust pipe may include a separate ring-shaped member on an inner periphery of the exhaust pipe. A cushioning mat may be inserted between the ring-shaped member and the exhaust pipe. The outer arc-shaped portions of the support member may be in contact with the ring-shaped member. With this structure, the difference in thermal expansion in the radial direction can be absorbed with reliability and also the impact load can be absorbed.

In the aspect of the present invention, the burner device may further comprise: an introduction cylinder that is provided integrally upstream of the burner catalyst and includes an opening formed in a side face, wherein the fuel supply valve, the igniter and a collision plate for collision of the supplied fuel are located in the opening; and an additional support member provided between the exhaust pipe and the introduction cylinder, wherein the additional support member may be formed in a corrugated shape in cross section including outer arc-shaped portions in contact with the exhaust pipe, inner arc-shaped portions in contact with an outer peripheral member of the introduction cylinder, and coupling portions for coupling the outer arc-shaped portions and the inner arc-shaped portions to each other. With this structure, since the burner catalyst and the introduction cylinder provided integrally upstream of the burner catalyst are supported respectively by the support member and the additional support member which are formed in a corrugated shape in cross section, even if a difference in thermal expansion occurs between the exhaust pipe and, the burner catalyst and the outer peripheral member of the burner catalyst, the difference in thermal expansion in the axial direction and the radial direction of the burner device is absorbed by the support member formed in a corrugated shape in cross section, so that the support stiffness of the burner catalyst in the burner device can be ensured to increase the durability.

An angle formed by the outer arc-shaped portion of the additional support member and the coupling portion, and an angle formed by the inner arc-shaped portion and the coupling portion respectively are preferably an obtuse angle in a plane orthogonal to the axis of the exhaust pipe.

In addition, preferably, the outer arc-shaped portion and the inner arc-shaped portion of the additional support member are welded respectively to the exhaust pipe and the introduction cylinder, and the inner arc-shaped portion of the support member is welded to the outer peripheral member of the burner catalyst, but the outer arc-shaped portion is not welded to the exhaust pipe to be able to slide in the axial direction. With this structure, even if a difference in thermal expansion occurs between the exhaust pipe and, the burner catalyst and the outer peripheral member of the burner catalyst, and the introduction cylinder, since the outer arc-shaped portion of the support member is not welded to the exhaust pipe so as to be able to slide in the axial direction, the radial support stiffness of the burner device is ensured, while the complete absorption of the difference in thermal expansion in the axial direction is possible.

DESCRIPTION OF EMBODIMENTS

Figure 1:
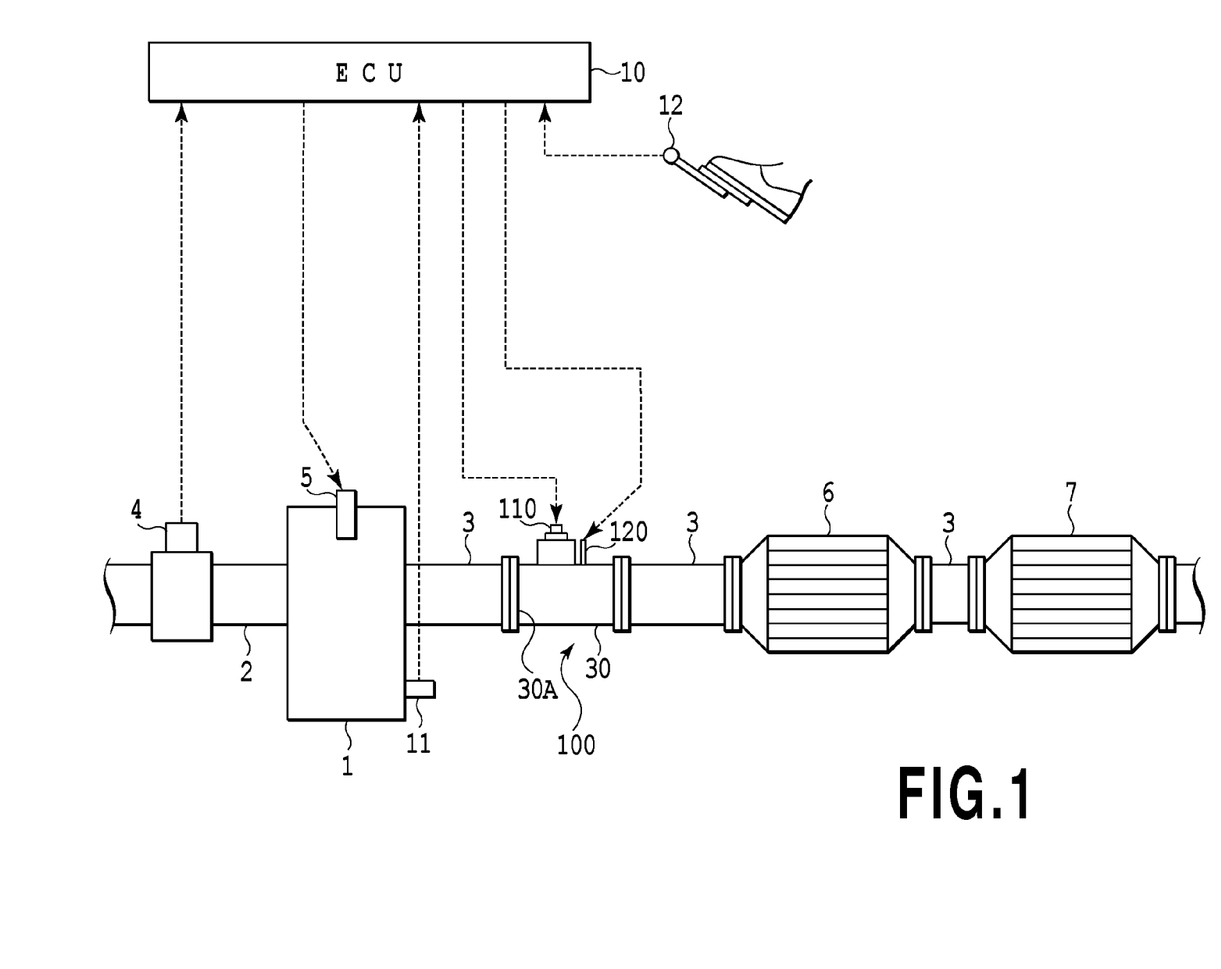
FIG. 1 is a schematic diagram showing an internal combustion engine in which a burner device according to the present invention is used, and intake and exhaust systems thereof.

Preferable embodiments according to the present invention will be in detail described below. FIG. 1 is an explanatory schematic diagram illustrating an engine body and intake and exhaust systems thereof in which a burner device for an exhaust-gas temperature rise according to the present invention is used.

The engine body 1 is, for example, an in-vehicle four-cycle diesel engine of in-line four cylinders. An intake pipe 2 and an exhaust pipe 3 are connected to the engine body 1. An airflow meter 4 is installed at some midpoint in the intake pipe 2 to output signals indicative of a flow quantity of intake air passing in the intake pipe 2. The airflow meter 4 detects the amount of sucked air (i.e., intake flow quantity) flowing into the engine body 1 per unit time. The engine body 1 has a plurality of cylinders, and an in-cylinder fuel injector 5 is provided in each cylinder. FIG. 1 shows only one in-cylinder fuel injector 5.

The tail end of the exhaust pipe 3 is connected to a muffler not shown, and is opened at the exit of the muffler into the atmosphere. An oxidation catalytic converter 6 and a NOx catalytic converter 7 are placed at some midpoint of the exhaust pipe 3 and arranged in series in this order from the upstream side.

The oxidation catalytic converter 6 initiates a reaction between unburned components such as HC, CO and the like and $O_2$ to form CO, $CO_2$, $H_2O$ and the like. As catalytic substances, for example, $Pt/CeO_2$, $Mn/CeO_2$, $Fe/CeO_2$, $Ni/CeO_2$, $Cu/CeO_2$, and like can be used.

The NOx catalytic converter 7 comprises preferably a NOx storage reduction catalytic converter (NSR: NOx Storage Reduction). The NOx catalytic converter 7 has functions of adsorbing NOx in the exhaust gas when the oxygen density in the incoming exhaust gas is high, and of reducing the adsorbed NOx when the oxygen density in the incoming exhaust gas becomes low and a reduction component (for example, fuel or the like) is present. The NOx catalyst converter 7 is structured by precious metal such as platinum Pt as a catalytic component and a NOx absorption component supported on the surface of a base material made of oxide such as alumina $Al_2O_3$ or the like. The NOx absorbing component is at least one selected from the group consisting of, for example, alkaline metal such as potassium K, sodium Na, lithium Li and cesium Cs, alkaline earth such as barium Ba and calcium Ca, and rare earth such as lanthanum La and yttrium Y. Incidentally, the NOx catalytic converter 7 may be a NOx selective catalytic reduction converter (SCR: Selective Catalytic Reduction).

In addition to the oxidation catalytic converter 6 and the NOx catalytic converter 7, a particulate filter (DPF) may be provided to trap fine particles (PM, particulate matters) such as soot or the like in the exhaust gas. Preferably, the DPF on which a metal catalyst is supported is of a continuously regenerating type of continuously oxidizing and burning the trapped fine particles. Preferably, the DPF is placed downstream of, at least, the oxidation catalytic converter 6 and also upstream or downstream of the NOx catalytic converter 7. It should be noted that, in a case of a spark ignition internal combustion engine (gasoline engine), a three-way catalyst is preferably provided in the exhaust gas passage. The oxidation catalytic converter 6, the NOx catalytic converter 7, the DPF and the three-way catalyst correspond to the exhaust treatment device of the present invention.

A burner device 100 for an exhaust-gas temperature rise according to the present invention is placed upstream of the oxidation catalytic converter 6 in the exhaust pipe 3. The burner device 100 includes a fuel supply valve 110, and a glow plug 120 serving as an igniter or an ignition device. Moreover, the burner device 100 of the present embodiment also includes a burner catalyst 130 and a collision plate 140 as described later. The burner device 100 is placed downstream of a collector in an exhaust manifold (not shown) connected to the engine body 1.

A turbocharger may be mounted downstream of the collector in the exhaust manifold. In this case, the burner device 100 is preferably provided downstream of the turbocharger (not shown) and also upstream of the oxidation catalytic converter 6.

In addition, as shown in FIG. 1, an electronic control unit (hereinafter referred to as "ECU") 10 is also provided for controlling various devices in response to an operation state of the engine body 1, a driver's request and the like. The ECU 10 includes a CPU for performing various types of arithmetic processing associated with engine control, a ROM for storing programs and data required for the control, a RAM for temporarily storing results of the arithmetic processing by the CPU and the like, and input and output ports for inputting and outputting signals from and to the outside.

The ECU 10 is connected through electric wiring to various sensors including, in addition to the aforementioned airflow meter 4, a crank angle sensor 11 for detecting a crank angle of the engine body 1 and an accelerator opening degree sensor for outputting an electric signal indicative of an accelerator opening degree. The output signals from them are input to the ECU 10. The ECU 10 is connected through electric wiring to various devices including the in-cylinder fuel injector 5, the fuel supply valve 110, and the glow plug 120, which are controlled by the ECU 10. The ECU 10 detects an amount of intake air on the basis of an output value of the airflow meter 4, an engine speed on the basis of an output value of the crank angle sensor 11, and a required load to be applied to the engine body 1 on the basis of an output value of the accelerator opening degree sensor 12.

In the present embodiment, for execution of the temperature rise control using the burner device 100, the ECU 10 activates the fuel supply valve 110 and the glow plug 120. That is, the ECU 10 actuates the fuel supply vale 110 to open the valve (ON) as appropriate so that the fuel is appropriately ejected from the fuel supply valve 110. Also, the ECU 10 appropriately applies power to the glow plug 120 to sufficiently raise the temperature.

Next, a first embodiment of the burner device 100 will be described with reference to FIG. 2 and FIG. 3. The burner device 100 according to the first embodiment includes, basically, the fuel supply valve 110 that supplies or injects liquid fuel (for example, light oil) F into the exhaust pipe 30, the glow plug 120 that ignites the fuel supplied from the fuel supply valve 110 to produce flames, and the burner catalyst 130 that oxidizes the fuel supplied from the fuel supply valve 110 for reforming. Further, the burner device 100 includes the collision plate 140 that redirects the supplied fuel toward the glow plug 120 to facilitate the ignition, as necessary. The burner device 100 includes an exhaust pipe 30 that is identical in diameter with the exhaust pipe 3 used in the exhaust system shown in FIG. 1, and flanges 30A provided at both the ends of the exhaust pipe 30, which are connected to flanges provided on the exhaust pipe 3 for use. For reference sake, the black arrow in FIG. 2 indicates the flow direction of the exhaust gas. The shown fuel supply valve 110 has a single injecting hole 110a, but may have a plurality of injecting holes.

The fuel supply valve 110 is inserted into and secured to a valve mounting boss 111 attached in an outer face portion of the exhaust pipe 30 in a direction perpendicular to the axial direction of the exhaust pipe 30. A cooling-water passage 112, through which cooling water flows to cool the fuel within the fuel supply valve 110, is defined in the valve mounting boss 111. The exhaust pipe 30 has a valve hole 31 through which the fuel ejected from the fuel supply valve 110 is made to pass.

The glow plug 120 is placed such that a heating portion 120a provided at the leading end of the glow plug 120 is situated slightly downstream of the fuel supply valve 110 and also upstream of the burner catalyst 130. The glow plug 120 is connected to an in-vehicle DC power source via a booster circuit not shown, so that the heating portion 120a produces heat when the power is applied. By the heat produced at the heating portion 120a, the fuel supplied from the fuel supply valve 110 is ignited to produce flames.

Figure 3:
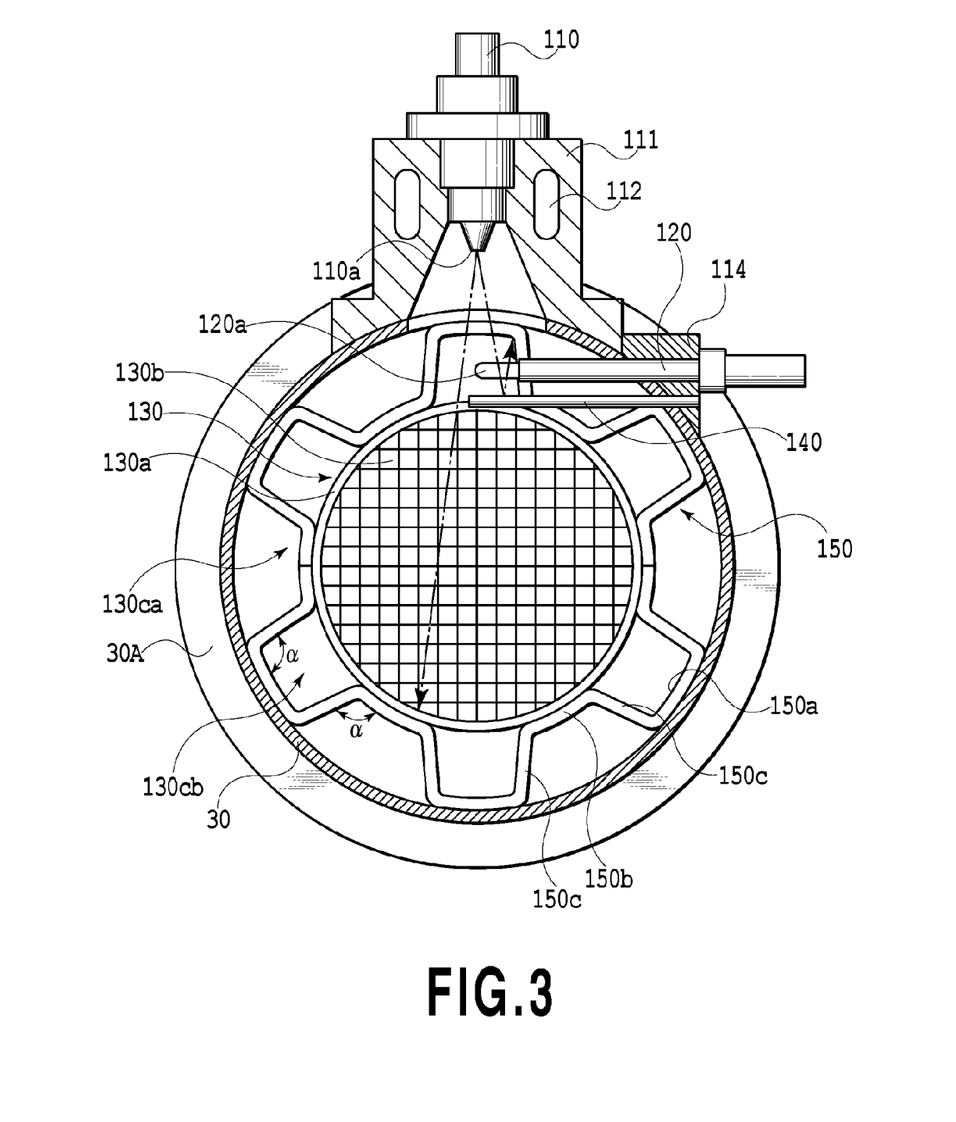
FIG. 3 is a sectional view taken along III-III line in FIG. 2.

As best seen from FIG. 3, the glow plug 120 is inserted into and secured to a plug mounting boss 114 attached to an outer face portion of the exhaust pipe 30, in a direction perpendicular to the axial direction of the exhaust pipe 30 and the axial direction of the fuel supply valve 110, so as to protrude into the exhaust pipe 30 through a hole of the exhaust pipe 30. A cooling-water passage (not shown), through which cooling water flows, may be defined also in the plug mounting boss 114.

The collision plate 140 is also inserted into and secured to the plug mounting boss 114, and protrudes into the exhaust pipe 30 through a hole of the exhaust pipe 30. The collision plate 140 can be formed of a material having superior heat resistance and superior impact resistance, such as stainless steel (hereinafter referred to as "SUS") and the like. The collision plate 140 in the present embodiment is formed in a rectangular shape.

In addition, the burner catalyst 130 is provided at a predetermined distance downstream from the fuel supply valve 110 to oxidize the fuel supplied from the fuel supply valve 110 for reforming. The burner catalyst 130 is held in the exhaust pipe 30 through a support member 150 as described later.

Upon supply of the fuel F to the burner catalyst 130, the fuel is oxidized within the burner catalyst 130 when the burner catalyst 130 is active at this time. By the heat of oxidation reaction occurring at this time, the burner catalyst 130 rises in temperature. Thus, the temperature of the exhaust gas flowing through the burner catalyst 130 can be raised. At a high temperature of the burner catalyst 130, hydrocarbons having a large number of carbon atoms in the fuel are decomposed to produce hydrocarbons having a small number of carbon atoms and high reactivity. As a result, the fuel is reformed to fuel having the high reactivity. In other words, the burner catalyst 130 forms a quick heater for producing quickly heat on one hand, and a reformed fuel ejector for ejecting the reformed fuel on the other hand.

The burner catalyst 130 is structured to occupy a part of the sectional area of the exhaust gas passage in the exhaust pipe 30. In the case of the present embodiment, as shown in FIG.

3, both the exhaust pipe 30 and the burner catalyst 130 are circular in cross section, are placed coaxially with each other, in which the outer diameter of the burner catalyst 130 is smaller than the inner diameter of the exhaust pipe 30. The burner catalyst 130 includes a cylindrical casing 130a made of heatproof metal such as SUS and the like, serving as an outer peripheral member and holding a catalyst supporting substrate therein. The casing 130a is supported in the exhaust pipe 30 by a support member 150 to be described later. An in-catalyst passage 130b is formed in the substrate of the burner catalyst 130 by a plurality of independent cells. An annular-shaped catalyst bypass passage 130c is formed between the outer periphery of the casing 130a and the exhaust pipe 30.

Here, as the burner catalyst 130 that is employed in the present invention, the substrate held in the cylindrical casing 130a may be of a metallic substrate type or a ceramic substrate type.

In a case of a metallic substrate type, for example, a thin-walled metallic flat-plate and a thin-walled metallic corrugated-plate are laminated, then rolled up into a cylindrical-column shape, and then brazed, thus providing the substrate. For example, an alumina catalyst support layer is formed on the surface of the substrate. Then, a precious-metal catalyst, such as platinum Pt, rhodium Rd and palladium Pd, is supported on the catalyst support layer.

On the other hand, in a ceramic substrate type, the substrate is formed of zeolite, cordierite or the like into, for example, a honeycomb structure, and the above-described precious-metal catalyst is supported on it. The burner device 130 is of a so-called straight flow type having a plurality of independent cells extending linearly from the upstream end to the downstream end.

Next, the aforementioned support member 150 will be described with reference to FIG. 3 and FIG. 6. The support member 150 in the present embodiment is formed in a corrugated shape in cross section by pressing a sheet of rectangular flat plate, which has outer arc-shaped portions 150a along and in contact with the inner periphery of the exhaust pipe 30, inner arc-shaped portions 150b along and in contact with the outer periphery of the cylindrical casing 130a which is the outer peripheral member of the burner catalyst 130, and coupling portions 150c each coupling the outer arc-shaped portion 150a and the inner arc-shaped portion 150b to each other. The outer arc-shaped portion 150a and each of the coupling portions 150c on both sides of the outer arc-shaped portion 150a form an angle α in a plane orthogonal to the axis of the exhaust pipe 30, and likewise the inner arc-shaped portion 150b and each of the coupling portions 150c on both sides of the inner arc-shaped portion 150b form an angle α in a plane orthogonal to the axis of the exhaust pipe 30. The angle α is set as an obtuse angle (for example, 120 degrees) to prevent the coupling portion 150c from buckling at thermal expansion.

Figure 6:
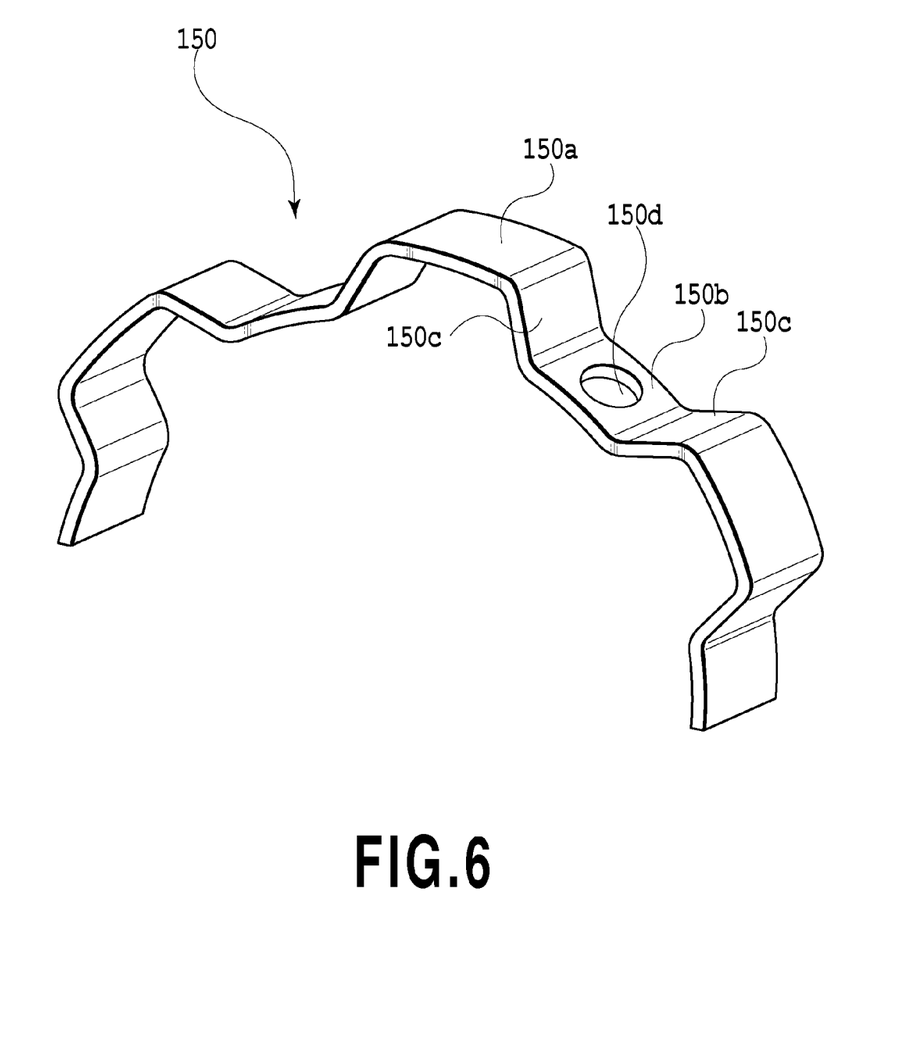
FIG. 6 is a perspective view illustrating an example of a support member of the burner device according to the present invention.

Then, the support member 150 in the present embodiment is formed by being split into two parts made of an upper half and a lower half of the support member 150, each having three crests (protrusions) (FIG. 6 shows only the upper half of the support member 150). However, the support member 150 may be formed in a ring shape in one piece without being split.

In the first embodiment of the above-described burner device 100, the burner catalyst 130 is mounted in the exhaust pipe 30 as follows. Specifically, one of the upper and lower halves of the support member 150, in which a through hole (shown as 150d in FIG. 6 for the sake of convenience because it is not visually recognized on the final product) is formed at the center in approximately the width direction of the inner arc-shaped portion 150b having a width in a predetermined axial direction, is positioned at the center in the axial direction of the cylindrical casing 130a of the burner catalyst 130. Then, the plug welding is performed on the through hole 150d, and then the one of the upper and lower halves of the support member 150 is fixedly secured to the cylindrical casing 130a. Then, the other of the upper and lower halves of the support member 150 is positioned on the cylindrical casing 130a, and similarly the plug welding is performed. In this manner, the support member 150 is fixedly secured to approximately the center in the axial direction of the cylindrical casing 130a of the burner catalyst 130. It should be noted that because the through hole 150d is provided simply for plug welding of the support member 150 and the cylindrical casing 130a of the burner catalyst 130, as long as the welding strength between the support member 150 and the cylindrical casing 130a is ensured, the through hole 150d may be formed in not all of the inner arc-shaped portions 150b but at least one thereof (refer to FIG. 6). Then, the burner catalyst 130 with the support member 150 fixedly secured thereto is inserted into the exhaust pipe 30 from the opening on which the right flange 30A in FIG. 2 is placed, and then held in a predetermined place by friction contact between the outer arc-shaped portions 150a of the support member 150 and the inner periphery of the exhaust pipe 30.

In the first embodiment of the burner device 100, when the fuel supplied from the fuel supply valve 110 is ignited by the glow plug 120, the burning flame passes through the in-catalyst passage 130b in the burner catalyst 130 held through the support member 150, and also passes through the catalyst bypass passage 130c between the burner catalyst 130 and the exhaust pipe 30. Thereby, the exhaust pipe 30, the burner catalyst 130 and the like are heated and thermally expand. Therefore, even if a difference in thermal expansion occurs between the exhaust pipe 30 and, the burner catalyst 130 and the cylindrical casing 130a which is the outer periphery member of the burner catalyst 130, since the differences in thermal expansion in the radial direction and the axial direction of the burner device 100 are absorbed by the support member 150 formed in a corrugated cross section, the support stiffness of the burner catalyst 130 in the burner device 100 is ensured and occurrence of thermal stress can be prevented to enhance the durability.

That is, in the radial direction of the burner device 100, because each of the angles α formed in a plane orthogonal to the axis of the exhaust pipe 30 by the outer arc-shaped portion 150a of the support member 150 and the coupling portion 150c and by the inner arc-shaped portion 150b and the coupling portion 150c is an obtuse angle, even if a difference in thermal expansion in the radial direction occurs between the exhaust pipe 30 and the cylindrical casing 130a of the burner catalyst 130, the coupling 150c can elastically deform without buckling to lessen the thermal stress.

In the axial direction of the burner device 100, even if the cylindrical casing 130a of the burner catalyst 130 thermally expands in the axial direction, since the casing 130a is supported at its center in the axial direction by the supporting member 150, the casing 130a is freely capable of thermally expanding in the axial direction. Accordingly, large thermal stress is prevented from occurring on the cylindrical casing 130a. In particular, according to the aforementioned embodiment in which the support member 150 is fixedly secured to the cylindrical casing 130a of the burner catalyst 130 by the plug welding using the through hole 150d provided in at least one inner arc-shaped portion 150b, the area for coupling the support member 150 and the cylindrical casing 130a is limited only to the size of the through hole 150d. Therefore, even if a difference in thermal expansion in the axial direction between the support member 150 and the cylindrical casing 130a, large thermal stress is prevented from occurring on both of the support member 150 and the cylindrical casing 130a. Further, with the aforementioned method using plug welding, the method is practicable with a small number of welding places and in a short time. Because of this, even if the welding process is included, the manufacturing can be performed relatively easily and the mass production is possible.

Figure 2:
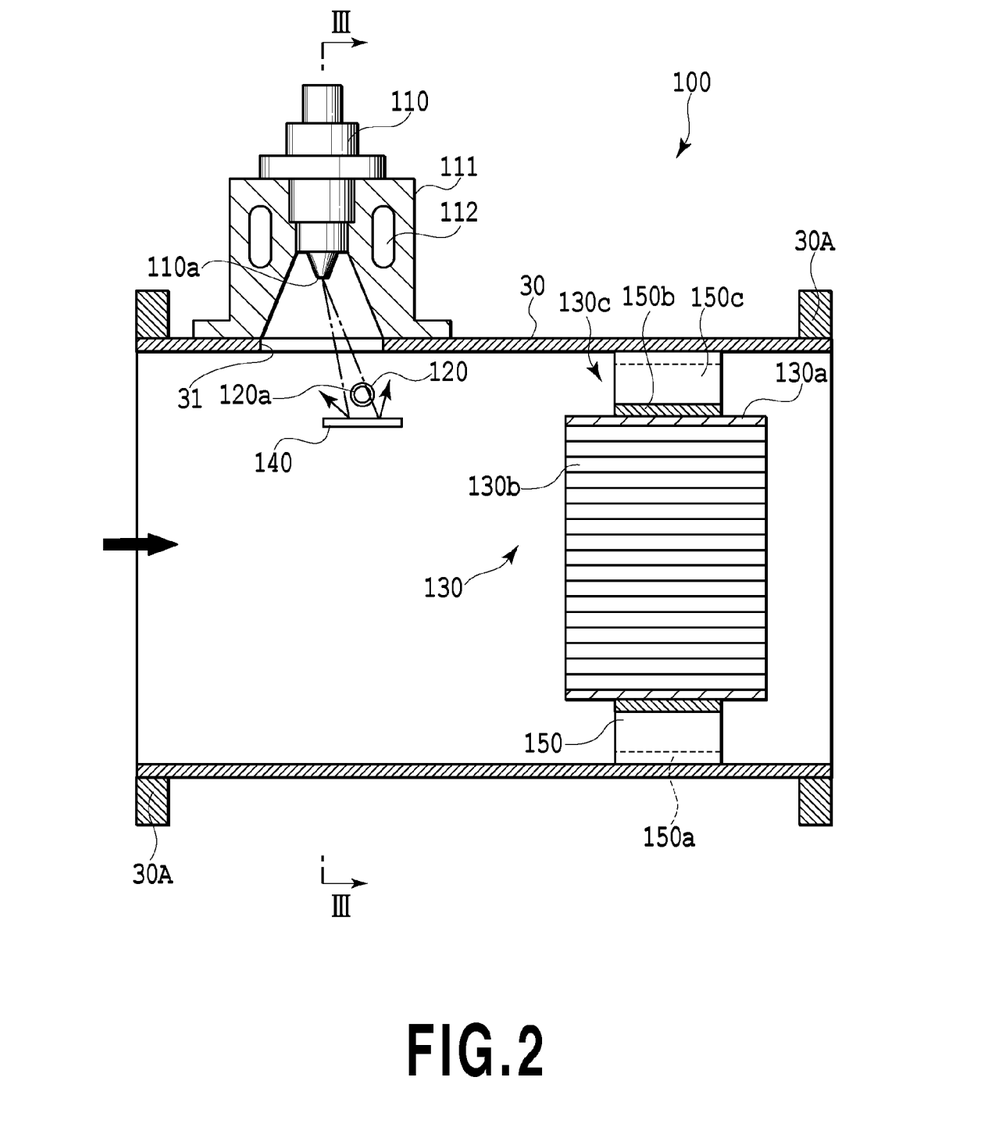
FIG. 2 is a vertical section view illustrating a first embodiment of the burner device according to the present invention.
Figure 8:
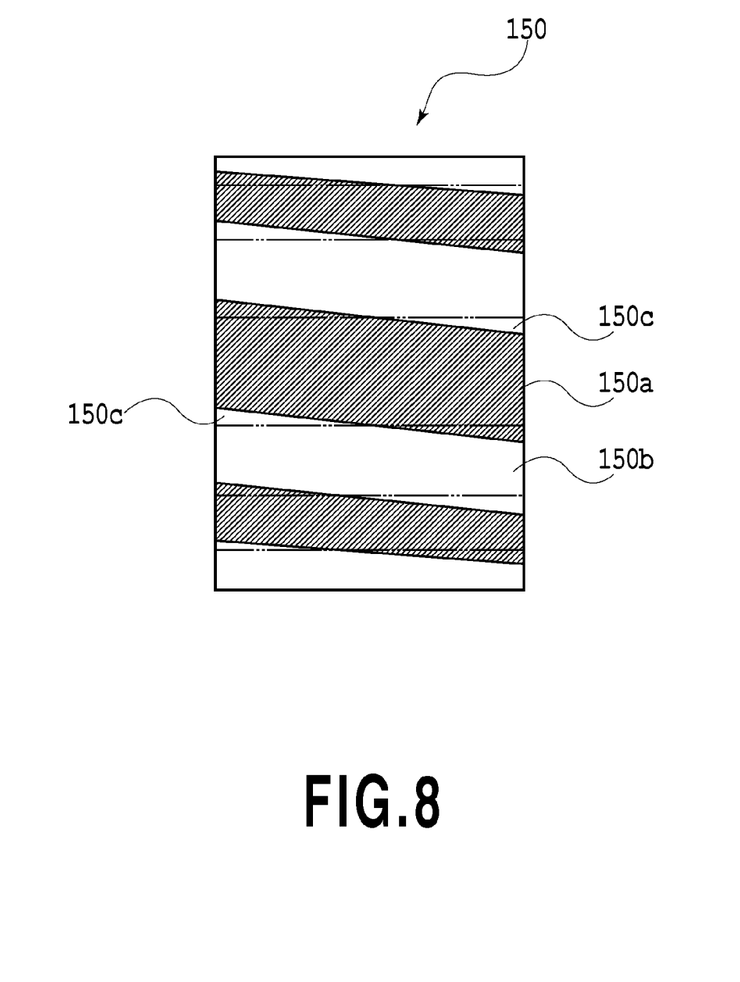
FIG. 8 is a plan view illustrating still another example of a support member of the burner device according to the present invention.

As shown in FIG. 2 and FIG. 3, the axis of the exhaust pipe 30 is parallel to a passage 130ca formed between the exhaust pipe 30 and the support member 150 (specifically, the area enclosed by the exhaust pipe 30, the inner arc-shaped portion 150b and the opposite coupling portions 150c), and a passage 130cb formed between the support member 150 and the casing 130a which is the outer periphery member of the burner catalyst 130 (specifically, the area enclosed by the casing 130a, the outer arc-shaped portion 150a and the opposite coupling portion 150c), which form a part in the axial direction of the ring-shaped catalyst bypass passage 130c between the outer periphery of the aforementioned casing 130a and the exhaust pipe 30. However, the support member 150 may be formed in a twist manner such that each of the passage 130ca and the passage 130cb is not in parallel to the axis of the exhaust pipe 30, but extends in a spiral fashion. For this purpose, for example, as shown in FIG. 8, the inner arc-shaped portion 150b of the recess of the support member 150 corrugated in cross section is formed to be in parallel to the axis of the exhaust pipe, while the outer arc-shaped portion 150a of the projection is not formed in parallel to the axis of the exhaust pipe, but is formed in a twist manner. This accelerates the mixing of the flames, which flow in the passage 130c (130ca, 130cb) between the exhaust pipe 30 and the casing 130a which is the outer periphery member of the burner catalyst 130, occurring downstream of the burner catalyst 130. Because of this, the temperature becomes uniform, improving the effect of raising the temperature of the exhaust gas. It should be noted that, in order to form each of the passage 130ca and the passage 130cb into a spiral shape, both of the outer arc-shaped portion 150a of the protrusion and the inner arc-shaped portion 150b of the recess may not be formed in parallel to the axis of the exhaust pipe, but may be formed in a twist manner.

Figure 4:
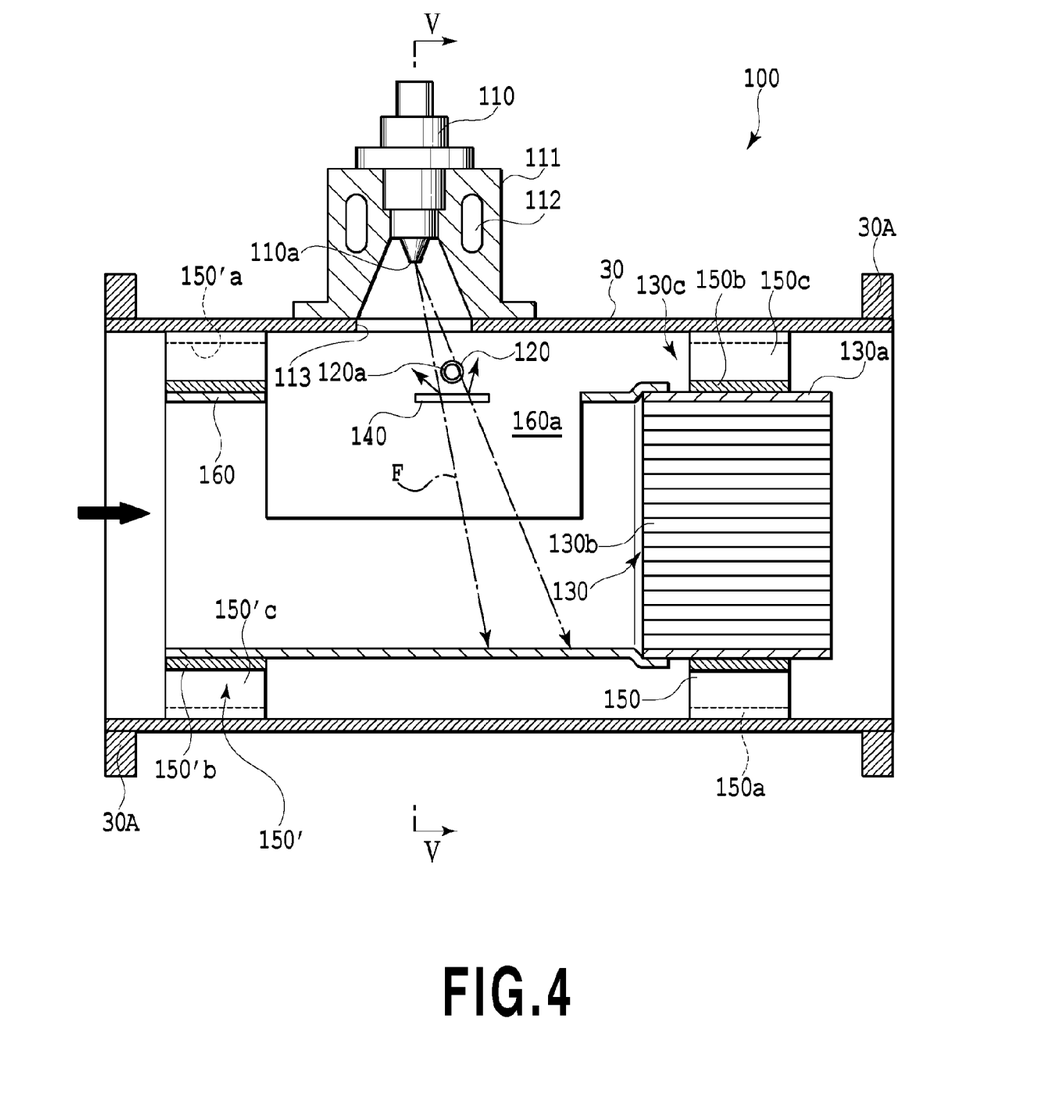
FIG. 4 is a sectional view illustrating a second embodiment of the burner device according to the present invention.
Figure 5:
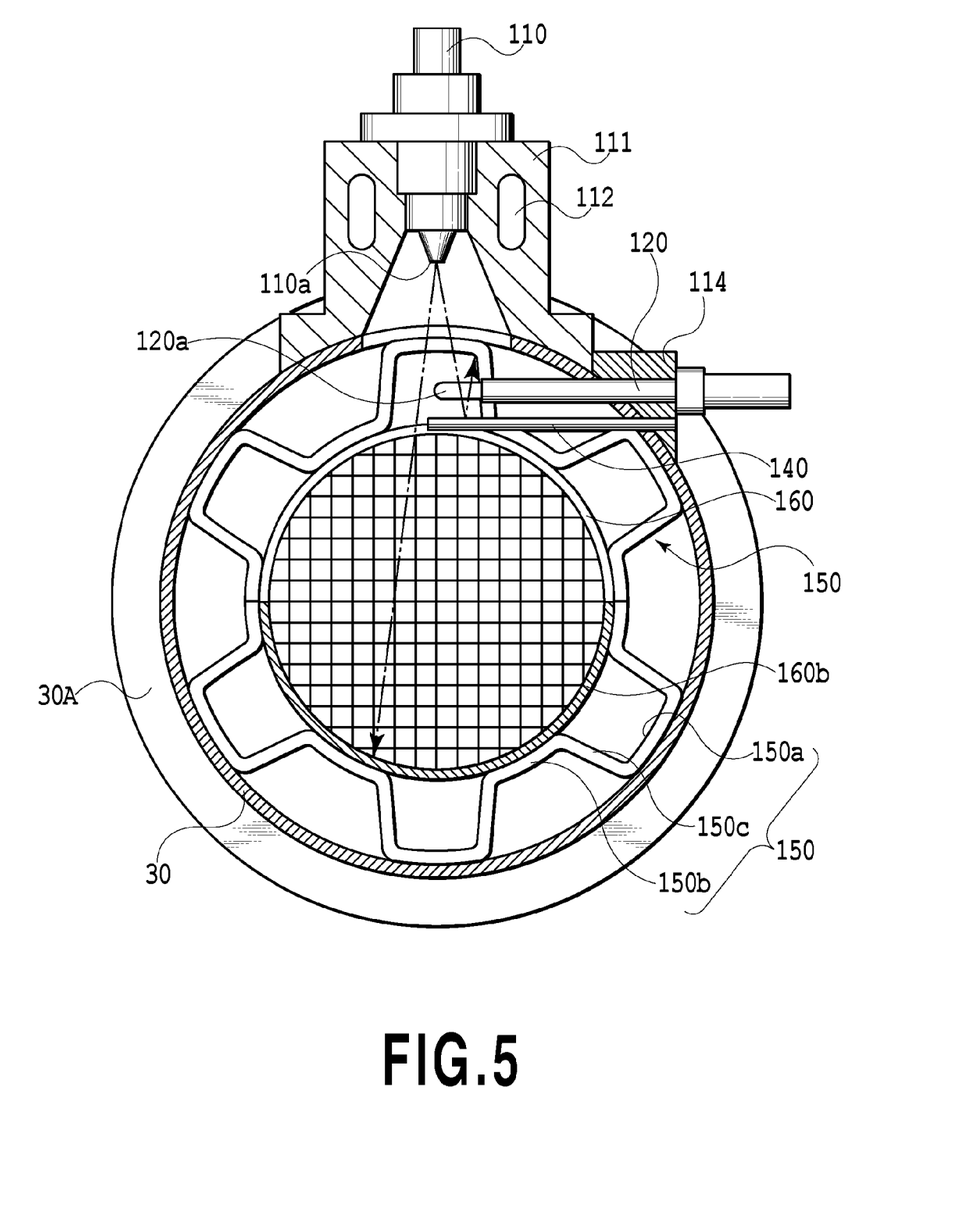
FIG. 5 is a sectional view taken along V-V line in FIG. 4.

Next, a second embodiment of the burner device 100 according to the present invention will be described with reference to FIG. 4 and FIG. 5. The second embodiment differs from the first embodiment in that an introduction cylinder for accelerating introduction of fuel into the burner catalyst 130 and an additional support member are additionally provided, so that components identical to those in the first embodiment are shown in the drawings by the identical reference signs, and a repeated description is avoided.

Specifically, the burner device 100 according to the second embodiment further includes an introduction cylinder 160 that is approximately identical in diameter with the burner catalyst 130 and is placed upstream of the burner catalyst 130. The introduction cylinder 160 is integrally attached by engaging a rear end of the introducing cylinder 160 with a front end of the casing 130a of the burner catalyst 130, and extends from the casing 130a toward the upstream direction. In the introduction cylinder 160, an approximately semicircular cross-section opening 160a is formed in an upper half portion of a central side face in the axial direction of the introduction cylinder 160, and a lower half portion of the introduction cylinder 160 is formed as an approximately semicircular cross-section tub-shaped portion 160b. In the opening 160a, the fuel supply valve 110, the glow plug 120 and the collision plate 140 for collision of the supplied fuel are placed. As in the case of the use of the support member 150 to support the casing 130a of the burner catalyst 130 in the exhaust pipe 30, the introduction cylinder 160 has a front end supported in the exhaust pipe 30 by an additional support member 150'. The introduction cylinder 160 receives the supplied fuel F supplied through the opening 160a on the tub-shaped portion 160b of the lower half portion, and then introduces and guides the supplied fuel F into the burner catalyst 130 while using the flow of the exhaust gas.

As similar to the aforementioned support member 150, the additional support member 150' is formed to be corrugated in cross section, which has outer arc-shaped portions 150' a in contact with the inner periphery of the exhaust pipe 30, inner arc-shaped portions 150'b in contact with the outer periphery of the introduction cylinder 160, and coupling portions 150'c each coupling the outer arc-shaped portion 150'a and the inner arc-shaped portion 150'b.

The outer arc-shaped portion 150'a and the inner arc-shaped portion 150'b of the additional support member 150' is plug-welded respectively to the exhaust pipe 30 and the introduction cylinder 160. The inner arc-shaped portion 150b of the support member 150 is plug-welded to the casing 130a of the burner catalyst 130, but the outer arc-shaped portion 150a of the support member 150 is not welded to the exhaust pipe 30 so as to be slidable in the axial direction.

In the second embodiment of the above-described burner device 100, the burner catalyst 130 and the introduction cylinder 160 located upstream thereof are mounted in the exhaust pipe 30 as follows. As described in the first embodiment, the support member 150 is fixedly secured, by plug welding, to approximately the center in the axial direction of the cylindrical casing 130a of the burner catalyst 130 including the introduction cylinder 160 integrally attached. Then, the inner arc-shaped portion 150'b of the additional support member 150' is fixedly secured to the outer periphery of the front end of the introduction cylinder 160 by plug welding. Then, the support member 150 and the additional support member 150' are fixedly secured, and then the burner catalyst 130 combined with the introduction cylinder 160 is inserted into the exhaust pipe 30 from the opening on which, for example, the right flange 30A is provided in FIG. 4. Then, the outer arc-shaped portion 150' a of the additional support member 150' is fixedly secured to the exhaust pipe 30 by plug welding (it should be noted that, in this case, a through hole not shown, is provided in at least one of the outer arc-shaped portions 150' a of the additional support member 150'). The outer arc-shaped portion 150a of the support member 150 and the exhaust pipe 30 are not welded to each other, and maintain friction contact with each other so as to be slidable in the axial direction.

In the second embodiment of the burner device 100, the fuel supply valve 110 injects the fuel F obliquely downward and slightly toward the downstream direction to direct it from above through the opening 160a of the introduction cylinder 160 toward the bottom surface of the tub-shaped portion 160b of the introduction cylinder 160. The ejected fuel F moves along a fuel path having a predetermined spraying angle. The heating portion 120a of the glow plug 120 and the collision plate 140 are placed along the fuel path. The collision plate 140 is placed in a position close to and slightly below the heating portion 120a. The glow plug 120 and the collision plate 140 are inserted into the exhaust pipe 30 from an upper side of the exhaust pipe 30 and linearly extend in parallel to each other and in the horizontal direction.

When the fuel supplied from the fuel supply valve 110 is ignited by the glow plug 120, the burning flame is guided by the introduction cylinder 160 (in particular, the tub-shaped portion 160b), while passing through the in-catalyst passages 130b in the burner catalyst 130 held via the support member 150, and also passing through the catalyst bypass passage 130c located between the burner catalyst 130 and the exhaust pipe 30. Upon collision of the fuel F with the collision plate 140, micronization and atomization of the fuel F is accelerated, improving the dispersibility and the diffusivity. Accordingly, the ignition caused by the glow plug 120 is accelerated. The glow plug 120 is situated at a level approximately equal to that of the catalyst bypass passage 130c above the burner catalyst 130, so that the flame produced by the ignition spreads mainly toward the inside of the catalyst bypass passage 130c located above the glow plug 120.

On the other hand, the fuel supplied without stopping at the collision plate 140 is guided to the tub-shaped portion 160b of the introduction cylinder 160 as described earlier, then is oxidized and reformed in the burner catalyst 130, and then is discharged from the burner catalyst 130. Then, the reformed fuel is fully oxidized and burned in the oxidation catalytic converter 6 in the downstream side, to be used for further rise in temperature of the exhaust gas or the like.

Here, also in the burner device 100 according to the second embodiment, the exhaust pipe 30, the burner catalyst 130, the introduction cylinder 160 and the like are heated to be thermally expanded. Therefore, even if a difference in thermal expansion occurs between the exhaust pipe 30 and, the introduction cylinder 160 and the cylindrical casing 130a of the burner catalyst 130 combined with the introduction cylinder 160, the differences in thermal expansion in the radial direction and the axial direction of the burner device 100 are absorbed by the support member 150 formed in a corrugated cross section and the additional support member 150'. That is, in the radial direction of the burner device 100, as in the case of the first embodiment, the support member 150 and the additional support member 150' which are formed in a corrugated shape having an obtuse angle α elastically support and absorb. On the other hand, in the axial direction of the burner device 100, even if the introduction cylinder 160 and the cylindrical casing 130a of the burner catalyst 130 combined with the introduction cylinder 160 thermally expand in the axial direction, the thermal expansion difference is absorbed. This is because the front end of the introduction cylinder 160 is fixedly secured to the exhaust pipe 30 by the additional support member 150', but the support member 150 to which the casing 130a is fixedly secured is not fixedly secured to the exhaust pipe 30 so as to be slidable in the axial direction.

Figure 7:
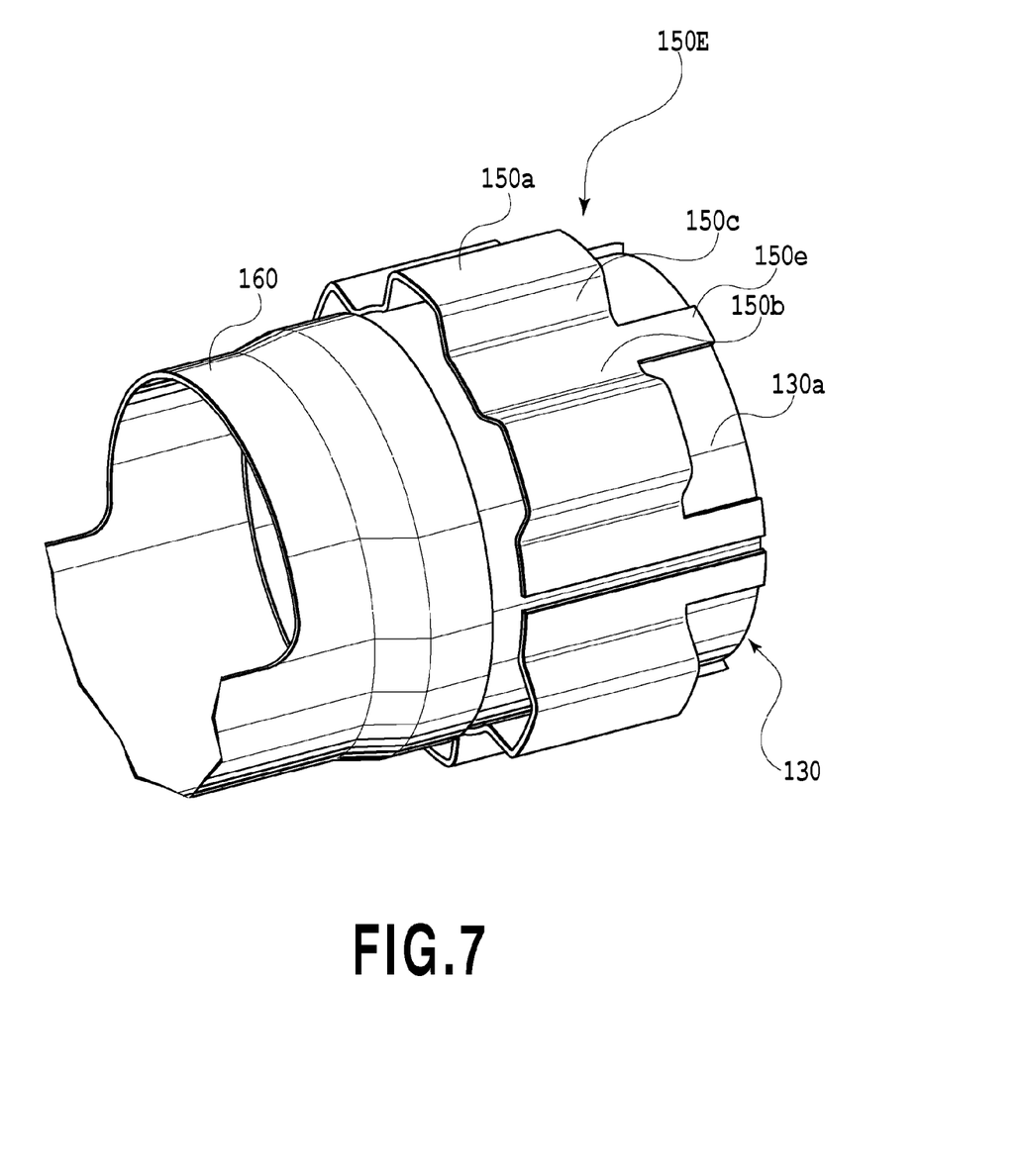
FIG. 7 is a perspective view illustrating another example of a support member of the burner device according to the present invention.

Next, a modification example of the support member of the burner device according to the present invention will be described with reference to FIG. 7. The modification example has commonalities with the aforementioned support member 150 in a basic main body, but differs in that strip-shaped portions 150e are added integrally with the inner arc-shaped portion 150b (hereinafter the support member including the strip-shaped portions 150e is designated by "150E"). The strip-shaped portion 150e is provided for preventing welding heat from excessively affecting the burner catalyst 130 when the support member 150 is welded to be fixedly secured to the cylindrical casing 130a of the burner device 130. That is, I-groove welding is applied between the end of the strip-shaped portion 150e and the end of the cylindrical casing 130a of the burner catalyst 30, thus preventing the welding heat from excessively affecting the inside of the burner catalyst 130. The support member 150E is particularly effective for the burner catalyst 130 of the metallic substrate type to which brazing is applied as described earlier because the brazed area is prevented from being damaged.

Figure 9:
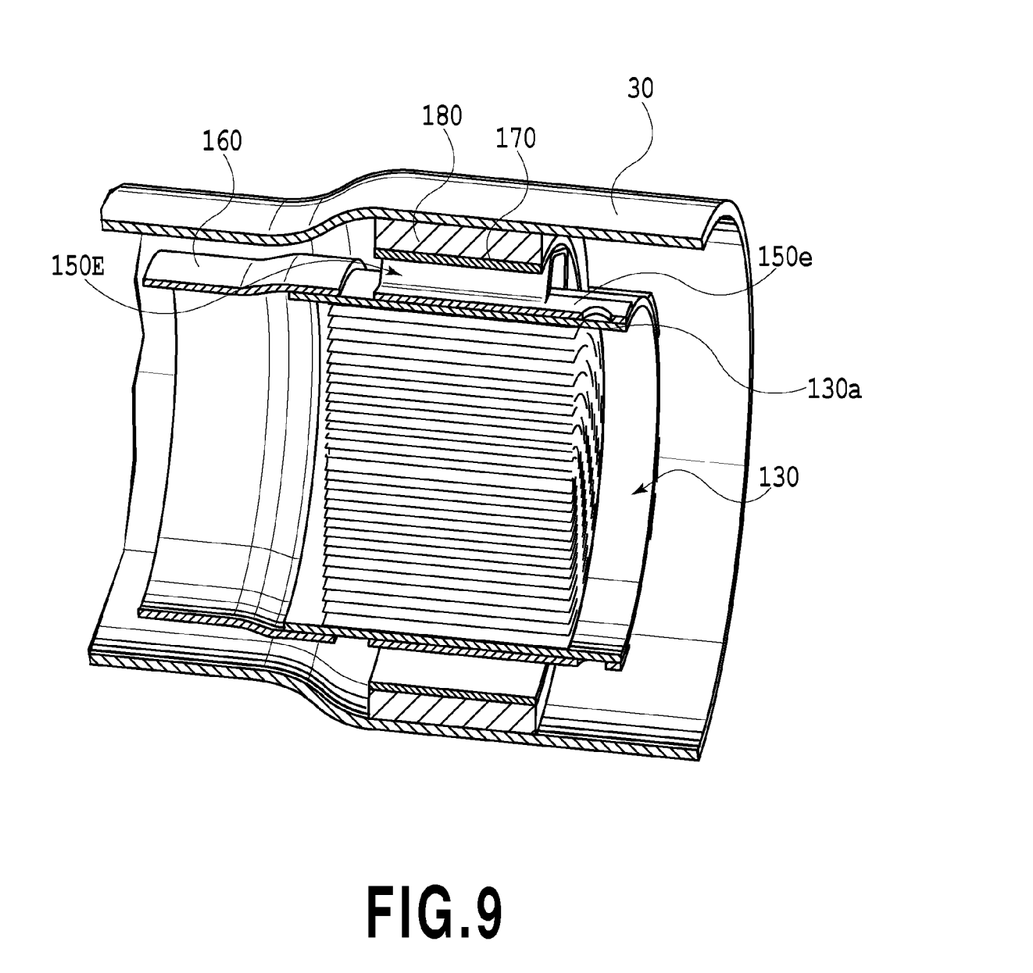
FIG. 9 is a cutaway perspective view illustrating a third embodiment of the burner device according to the present invention.

Further, a third embodiment according to the present invention will be described with reference to FIG. 9. The third embodiment differs from the second embodiment only in that a separate ring-shaped member and a cushioning mat are added to the inner periphery of the exhaust pipe. Therefore, the differences are mainly described and components identical to those in the second embodiment are shown in the drawings by the identical reference signs, and a repeated description is avoided.

That is, a separate ring-shaped member 170 is provided on the inner periphery of the exhaust pipe 30. A cushioning mat 180 is interposed between the ring-shaped member 170 and the exhaust pipe 30. Then, as in the case of the aforementioned embodiments, the cylindrical casing 130a of the burner catalyst 130 is held via the support member 150E in the ring-shaped member 170. That is, the outer arc-shaped portions 150a of the support member 150E in which the strip-shaped portions 150e combined with the inner arc-shaped portions 150b are I-groove-welded to the cylindrical casing 130a are in friction contact with the ring-shaped member 170. In other words, the outer arc-shaped portion 150a of the support member 150E is not fixedly secured to the ring-shaped member 170 so as to be able to slide in the axial direction. Incidentally, the cushioning mat 180 may be a mat made of alumina fiber having high heat resistance.

According to the third embodiment, since the outer arc-shaped portion 150a of the support member 150E is not secured to the ring-shaped member 170 and is slidable in the axial direction, this absorbs a difference in thermal expansion in the axial direction. A difference in thermal expansion in the radial direction is absorbed with reliability by deformation of the cushioning mat 180 in addition to the support member 150E, and also impact loads can be absorbed.

REFERENCE SIGNS LIST 3, 30 Exhaust pipe
100 Burner device
110 Fuel supply valve
120 Glow plug
130 Burner catalyst
130a Cylindrical casing
130b In-catalyst passage
130c Catalyst bypass passage
140 Collision plate
150 Support member
150a Outer arc-shaped portion
150b Inner arc-shaped portion
150c Coupling portion
150e Strip-shaped portion
150' Additional support member
160 Introduction cylinder
160a Opening
160b Tub-shaped portion
170 Ring-shaped member
180 Cushioning mat

The invention claimed is:
1. A burner device placed upstream of an exhaust treatment device mounted in an exhaust pipe to raise a temperature of an exhaust gas, comprising:
   a fuel supply valve for supplying fuel into the exhaust pipe;
   an igniter that ignites the fuel supplied from the fuel supply valve; and a burner catalyst held in the exhaust pipe through a support member, wherein the support member is formed in a corrugated shape in cross section including outer arc-shaped portions in contact with the exhaust pipe, inner arc-shaped portions in contact with an outer peripheral member of the burner catalyst, and coupling portions for coupling the outer arc-shaped portions and the inner arc-shaped portions to each other, an introduction cylinder that is provided integrally upstream of the burner catalyst and includes an opening formed in a side face, wherein the fuel supply valve, the igniter and a collision plate for collision of the supplied fuel are located in the opening;

an additional support member provided between the exhaust pipe and the introduction cylinder, wherein the additional support member is formed in a corrugated shape in cross section including outer arc-shaped portions in contact with the exhaust pipe, inner arc-shaped portions in contact with an outer peripheral member of the introduction cylinder, and coupling portions for coupling the outer arc-shaped portions and the inner arc-shaped portions to each other;

wherein an angle formed by each of the outer arc-shaped portions of the additional support member and each of the coupling portions, and an angle formed by each of the inner arc-shaped portions and each of the coupling portions respectively are an obtuse angle in a plane orthogonal to the axis of the exhaust pipe; and wherein the outer arc-shaped portion and the inner arc-shaped portion of the additional support member are welded respectively to the exhaust pipe and the introduction cylinder, and the inner arc-shaped portion of the support member is welded to the outer peripheral member of the burner catalyst, but the outer arc-shaped portion of the support member is not welded to the exhaust pipe to be able to slide in the axial direction.

2. The burner device according to claim 1, wherein each of passages formed between the exhaust pipe and the support member and between the support member and the outer peripheral member of the burner catalyst is not formed in parallel to the axis of the exhaust pipe, but is formed in a twist manner.

3. The burner device according to claim 1, wherein
the exhaust pipe further includes a separate ring-shaped member on an inner periphery of the exhaust pipe,
a cushioning mat is inserted between the ring-shaped member and the exhaust pipe, and
the outer arc-shaped portions of the support member are in contact with the ring-shaped member.

4. The burner device according to claim 1, wherein each of angles formed by each of the outer arc-shaped portions and each of the coupling portions of the support member, and by each of the inner arc-shaped portions and each of the coupling portions of the support member in a plane orthogonal to an axis of the exhaust pipe is an obtuse angle.

5. The burner device according to claim 4, wherein each of passages formed between the exhaust pipe and the support member and between the support member and the outer peripheral member of the burner catalyst is not formed in parallel to the axis of the exhaust pipe, but is formed in a twist manner.

6. The burner device according to claim 4, wherein
the exhaust pipe further includes a separate ring-shaped member on an inner periphery of the exhaust pipe,
a cushioning mat is inserted between the ring-shaped member and the exhaust pipe. and
the outer arc-shaped portions of the support member are in contact with the ring-shaped member.

* * * * *